Dec. 11, 1928.
D. BROWN
INDICATOR BOARD
Filed July 23, 1927
1,694,639
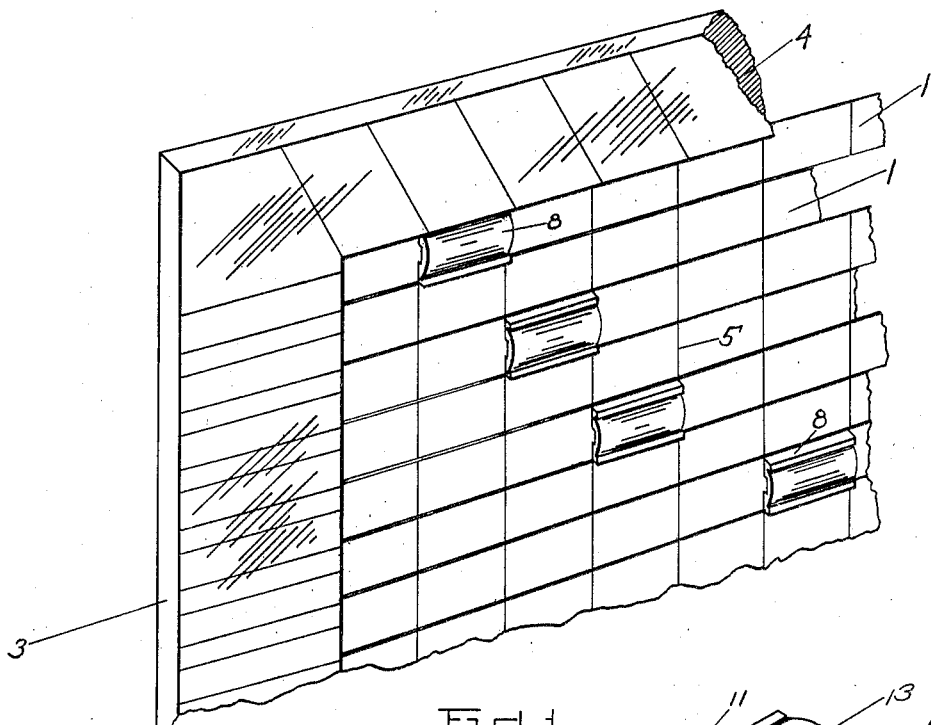
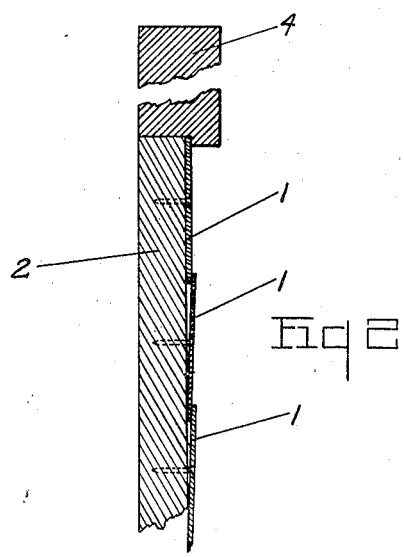
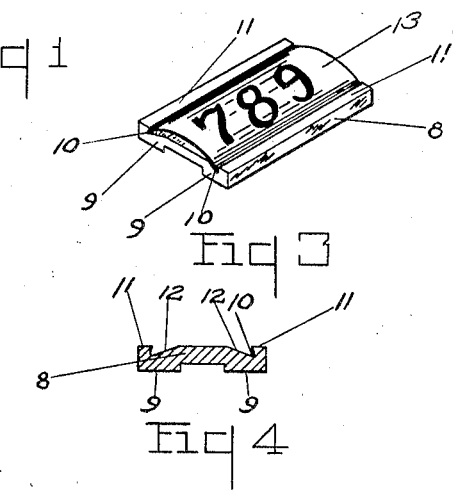
Inventor
Davis Brown.

Patented Dec. 11, 1928.

1,694,639

UNITED STATES PATENT OFFICE.

DAVIS BROWN, OF BUCYRUS, OHIO, ASSIGNOR OF ONE-HALF TO W. A. RIDDELL, OF BUCYRUS, OHIO.

INDICATOR BOARD.

Application filed July 23, 1927. Serial No. 207,843.

My invention has for its object to provide an indicator board to be used to indicate the status of any proceeding, or to indicate a great variety of variable conditions, such as for example, to indicate the quantity of supplies of different kinds that enter into the manufacture of machinery or devices, or to indicate the changes in the essentials that pertain to business growth.

The invention particularly has for its object to provide members that may be shifted over the board that may be readily altered or replaced to vary the indication of the board.

The invention may be contained in bulletin boards, or indicators, and structures of different kinds, and used for different purposes. To illustrate a practical application of the invention, I have selected an indicator board as an example of the structures containing my invention, and shall describe it hereinafter. The indicator board referred to is shown in the accompanying drawing.

Fig. 1 is a broken view showing one corner of the board. Fig. 2 is a view of a vertical section taken through a part of the board. Fig. 3 is a perspective view of one of the movable or transferable indicia members whose location on the bulletin board determines its particular indication. Fig. 4 is a view of a transverse section taken through the indicia member illustrated in Fig. 3.

In the particular form of construction which has been selected as an example of the different embodiments of my invention, the indicator or bulletin board is substantially covered with a magnetic sheet material. The magnetic sheet material may be made in the form of a plurality of steel strips 1 which are secured in parallel relation and may be located either horizontally or vertically. The strips 1 are secured to a suitable board 2 that forms a supporting part of the construction by any suitable means, such as, by screws or nails that may be located at intermediate points along the strips 1. The strips are, preferably, located horizontally and in parallel relation and so as to substantially cover the entire area of the indicator board.

The magnetic sheet material of the board may be corrugated or provided with suitable guiding ridges. In the particular form shown, the strips 1 are located so that their edges overlap. The side edges of the lower strips are located on the outside of the contiguous higher strips. This forms a ledge that extends along the lower edge of the strips. The board may be provided with a frame 3 which may have suitable printed matter or indicating phrases or words located in areas that are spaced relative to each other and which are associated with one or more corrugations or ridges formed in or on the magnetic sheet material of the board. Such descriptive words, or phrases, may be located along one of the vertical sides of the frame and along the top side of the frame that are to be associated with definite areas of the magnetic sheet material of the board. The eye will be directed horizontally by the corrugations, or ridges, and, if desired, vertical lines 5 may be drawn in order that the eye may be readily directed vertically to the areas of the board that are to be associated with the particular words, or phrases, that are located on the sides of the frame of the board, or from the designative phrases to the definite areas of the board. Thus the portions of the strips located below the indicative matter at the top of the frame, will bear a definite significance with reference to the indicative matter on the vertical sides of the frame, and the particular significance that is attached to these areas is determined by the location of suitable marking or other indicia that may be placed in these particular areas.

In order to provide a shiftable, or replaceable, member for marking or indicating particular areas along the strips, a readily transferable and attachable means is located on each of the strips. The markers, or indicators, that I have provided are formed of permanently magnetized steel blocks 8. The steel blocks, or indicia members, 8 are formed with ridges 9 and the indicia members 8 are so magnetized that the ridges 9 constitute the poles of the magnets. Consequently there is thus produced a field of force in the regions of the poles 9, the lines of force extending from one ridge to the other. When, therefore, the blocks, or indicia members, 8, are placed so that the poles 9 are in contact with the strips 1, the indicia members 8 will be securely held in the positions along the strips 1 in which they may be placed or to which they may be shifted. The corrugations, or ridges, or, in the particular form shown, the upper side edges of the contiguous lower strips will operate as guides for the indicia members when they are shifted over the board. The blocks may be also marked to aid in identifying the descriptive matter of the sides of the frame. Thus the blocks 8 will indicate the modifying condition, or relation. as between the items specified on the sides of the frame of the bulletin board as determined by the location of the indicia members 8.

In order to further modify the indications that are produced by the various locations of the indicia members, the replaceable indicia members, if desired, may also be characteristically marked which will introduce a modifying element in the deductions that are to be made from the relative location of the indicia members. The markings, if desired, may be placed permanently on the indicia members, and the indicia members replaced, or the markings may be readily and replaceably secured to the indicia members. Thus the indicia members may be provided with suitable grooves 10, that are so formed as to produce overhanging ridges 11 and sloping surfaces 12, into which cards 13 may be secured by its elasticity. The cards 13 may be slightly bent to permit its edges to enter the grooves 10 and be secured by the overhanging ridges 11. The sloping surfaces 12 will permit the desired curvature of the cards 13 when slightly bent in the manner shown in Fig. 3. Suitable indicative matter may be placed on each of the cards 13 which will designate the particular indicia member 8 and when each particular indicia block, having its characteristic designative mark, is located in the regions of the strips which, by the cross significance produced by the associated items of the vertical and horizontal parts of the frame of the board, give certain indications, such indications may be further modified by the particular designations of the indicia member. Thus the invention will provide for a three factor variation of any alterable condition, or status, with reference to any item involved, or to be considered, and is exceedingly convenient to handle and manipulate and may be constructed at a very little cost.

I claim:

1. In an indicator board, a magnetic sheet metal material distributed over the surface of the board, the sheet material having guiding parts, slidable indicia members of magnetic material magnetically secured in their relative positions on the sheet metal along the guiding parts.

2. In an indicator board, a plurality of strips of magnetic material distributed over the surface of the board, a plurality of indicia members formed of magnetic material and magnetically secured in position along the strips, the strips having ledges for guiding the movement of the indicia members along the strips.

3. In an indicator board, a plurality of strips of magnetic material distributed over the surface of the board and having overlapping portions, indicia members of magnetic material magnetically connected to the strips and slidably guided by the edges of contiguous strips.

4. In an indicator board, a plurality of strips of magnetic material distributed over the surface of the board and having overlapping portions, indicia members of magnetic material magnetically connected to the strips and slidably guided by the edges of contiguous strips, a plurality of indicative parts and means for removably connecting the indicative parts to the indicia members.

5. In an indicator board, a plurality of strips distributed over the board, the lower of two contiguous strips having an edge portion located on the outside of a side edge portion of the contiguous upper strip, a plurality of magnetized indicia members located on the strips and guided by the edges of the contiguous lower strips.

6. In an indicator board, a plurality of strips distributed over the board, the lower of two contiguous strips having an edge portion located on the outside of a side edge portion of the contiguous upper strip, a plurality of magnetized indicia members located on the strips and guided by the edges of the continguous lower strips, the indicia members having replaceable indicative parts, means for removably connecting the indicative parts with the indicia members, the edges of the board having indicative phrases whose designative character is modified by designative phrases located at the end of the board and which is definitely characterized by the location of the indicia members on the strips, the indicia members having replaceable indicative parts which operate to further modify the designative condition as determined by the location of the indicia members.

In witness whereof I have hereunto signed my name to this specification.

DAVIS BROWN.